3,267,121
ORGANOMERCURIC HYDRAZINE COMPOUNDS AND PROCESS FOR THE PRODUCTION THEREOF
Heinrich Klös, Wuppertal-Elberfeld, and Paul-Ernst Frohberger, Burscheid, Bezirk Dusseldorf, Germany, assignors to Farbenfabriken Bayer Aktiengesellschaft, Leverkusen, Germany, a German corporation
No Drawing. Filed Mar. 6, 1963, Ser. No. 263,122
Claims priority, application Germany, Mar. 9, 1962, F 36,225
11 Claims. (Cl. 260—434)

It has been found that organomercuric hydrazine compounds of the formula

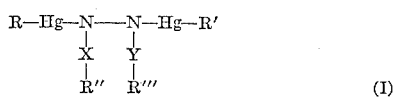

(I)

in which
R, R', R" and R'" stand for alkyl, alkenyl, cycloalkyl, aryl, aralkyl or heterocyclic radicals which may be further substituted by halogen, hydroxy, alkoxy, aryloxy, acyloxy, nitro groups, free or substituted amino, ester or carbonyl groups, and
X and Y stand for carbonyl or sulfonyl groups possess an excellent fungicidal and bactericidal activity.

In the above formula of the organomercuric hydrazine compounds R, R', R" and R'" preferably stand for alkyl groups with 1 to 4 carbon atoms, cycloalkyl groups with 5 to 6 carbon atoms and the phenyl radical. These radicals are preferably substituted by one or more of the following substituents: halogen, such as chlorine and bromine, hydroxy, alkyloxy with 1 to 4 carbon atoms, acyloxy with 1 to 4 carbon atoms, the nitro group and dialkylamino groups with 1 to 4 carbon atoms in the alkyl radicals.

In the first instance, the compounds of the invention are suitable as seed dressing for combating fungal plant diseases. They can be applied as powders, solutions, emulsions, suspensions or pastes either by themselves or in combination with other plant protectants or cultivation assistants. They are stable upon storage in the pure form and in admixture with liquid or solid inert diluents. Their phytotoxicity is relatively low, especially in the case of those compounds which contain as alkyl groups the methyl or ethyl radical to the mercury. Compared with other alkyl-Hg compounds such as methyl-Hg hydroxide, methyl-Hg bromide or ethyl-Hg chloride, the alkyl compounds of this type possess a substantially lower vapour pressure. The risk of poisoning by inhalating poisonous vapours during their production and use is thus substantially reduced. On the other hand, these compounds, surprisingly possess nevertheless a practically important fungicidal activity even in the gaseous phase which is not attained by other customary organomercuric compounds such as, for example, phenyl-Hg acetate. This effect enables an activity at a certain distance, which is especially desirable, for example, when with small amounts of liquid of, for example, 2 ml. per kg. of seeds an even distribution of the seed dressing on the seed surface can not be achieved. In this case, a re-distribution, for example in the sack from grain to grain, is possible and also hidden disease germs, e.g. of Ustilago avenae underneath the oat spelts or of Phoma betae in beet balls, can be reached by the active substance and thus destroyed.

As compared with the customary mercury compounds such as ethyl-Hg chloride or methyl-Hg hydroxide, the alkyl-Hg hydrazine compounds thus possess the same activity with the advantage of a lower vapour pressure, rendering the preparations less dangerous. Compared with aryl compounds such as phenyl-Hg acetate, the compounds of the invention are distinguished by a higher activity, especially against hidden disease germs.

It has also been found that the organomercuric hydrazine compounds of the above mentioned general formula are easily obtained in good yield by reacting N-N'-bis-acyl-hydrazines or their N-alkali metal salts with organomercuric hydroxides or organomercuric salts, preferably in inert solvents or diluents, but optionally also without a diluent.

It was not to be foreseen and therefore surprising that such organomercuric hydrazine compounds can exist at all, since, on the one hand, hydrazine compounds are very strong reducing agents and, on the other hand, all mercury compounds are very easily reduced, frequently even to the metal mercury itself.

Contrary to expectation, the compounds to be obtained according to the general process of the invention are very stable and durable. A great number, especially those in which the acyl groups are characterised by carbonyl groups, can be re-crystallised from suitable solvents without decomposition and possess well-defined melting points without previous decomposition.

As mercury-containing component of the starting substances for these organomercuric hydrazine compounds, organomercuric salts are used, for example methyl mercury sulphate, ethyl mercury bromide, butyl mercury chloride, methoxy ethyl mercury sulphate, hydroxyethyl mercury benzoate, acetoxypropyl mercury acetate, 2-ethoxy-cyclohexyl mercury acetate, phenyl mercury propionate, p-dimethyl aminophenyl mercury butyrate, p-hydroxyphenyl mercury acetate, 3-nitro-4-methylphenyl-1-mercury chloride, 3-chloro-4-hydroxyphenyl-1-mercuric sulphate, α-thienyl-mercuric chloride etc. However, organomercuric hydroxides, for example methyl mercury hydroxide, methoxyethyl mercury hydroxide, phenyl-mercury hydroxide etc., are likewise suitable.

These mercury-containing components are reacted with hydrazines, both amino groups of which are acylated, or with the N-alkali metal salts of such hydrazines. As such hydrazines which are acylated on both nitrogen atoms there are to be understood all hydrazines which are substituted on both nitrogen atoms by any radicals of carboxylic acids or organic sulphonic acids. Examples of such N-N'-bisacylated hydrazines are N-N'-diacetyl-hydrazine, N-N'-dibenzoyl-hydrazine, N-N'-bis-ethane-sulphonyl-hydrazine or N-N'-bis-nicotinoyl-hydrazine. The acyl radicals adhering to the two nitrogen atoms may also differ from one another as is the case, for example, with N-acetyl-N'-benzoyl-hydrazine, N-benzoyl-N'-methane-sulphonyl-hydrazine and many others.

On account of the acidic nature of the hydrogen atoms still adhering to the nitrogen atoms, these bis-acyl-hydrazines form alkali metal salts which can likewise be converted according to the invention. Since an approximately quantitative conversion can only be achieved at the neutral point of the reaction mixture, the alkali metal compounds of N-N'-bis-acyl-hydrazines are expediently reacted with organomercuric salts, for example organomercuric sulphates, whilst the free N-N'-bis-acyl-hydrazines are expediently reacted with organomercuric hydroxides. However, it is also possible to treat solutions of organomercuric salts with the amount of alkali equivalent to their acid ion and then add the free N-N'-bis-acyl-hydrazines, or, alternatively, add the quantity of alkali equivalent to the acid ion of the organomercuric salt to a solution of organomercuric salts and N-N'-bis-acyl-hydrazines. As alkalies there are to be understood in the first instance oxides, hydroxides and carbonates of sodium and potassium, but the oxides, hydroxides and carbonates of the other alkali metals, i.e. of lithium, cesium and rubidium are also suitable. In some cases, salts of ammonia, primary, secondary or tertiary amines or of quaternary ammonium bases may also be employed.

The following formula scheme may illustrate the reaction:

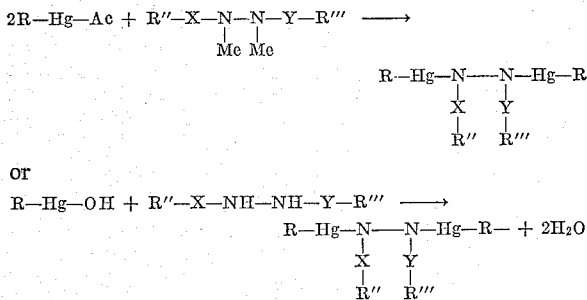

In these equations, R, R'' and R''' as well as X and Y have the same significance as in the above mentioned general Formula I; Ac is a monovalent organic or inorganic acid ion and Me is an alkali metal.

It is not necessary to isolate the organomercuric compounds to be employed before using them. Their solutions can be used for the reaction when and as they are formed and their mercury content has been determined by analysis. Extraneous salts which are still present in such reaction solutions from the production of the organomercuric compounds seldom interfere. In a few cases only, where the products of the process are very readily soluble in water, it is advantageous for a more convenient isolation to use previously purified organomercuric starting materials.

In most cases it is also unnecessary to use the N-N'-bis-acyl-hydrazines in the pure state. However, in any case, it must be ensured that non-acylated nitrogen compounds are no longer present in any form, since such non-acylated nitrogen compounds reduce the added organomercuric component instead of binding it.

The reaction of the hydrazines acylated on both nitrogen atoms, or of their alkali metal salts, with the organomercuric component is, in general, carried out in solution and at room temperature or, if need be, at an only slightly elevated temperature. The reaction is accelerated and completed by intense stirring.

In most cases water is well suitable as inert solvent, but other solvents which are indifferent to both reaction components, such as glycols, alcohols, glycol ethers, dioxan, tetrahydrofuran and others, can also be used, if necessary.

An intimate mixing of the two components mixed with inert solid diluents can also lead to the desired result, but in most cases this requires a longer reaction period so that working in liquid inert solvents is generally to be preferred. As inert solid diluents there may be mentioned talc, kieselguhr, kaolin, barium sulphate or sodium sulphate, for example.

By an appropriate selection of the reaction components and the inert solvent, separation of the products of the invention can be attained in most cases. If, however, the products dissolve easily in the solvents used and are therefore not separated out, they can be isolated by concentration of the reaction solutions, if required even to dryness, followed by extraction with a suitable solvent. For purification the products of the invention can also be recrystallised from suitable solvents, if necessary.

The organomercuric hydrazine compounds are indefinitely stable in a neutral solution or in the solid state. However, stronger acids or alkalies decompose them more or less rapidly and completely. Depending on the choice of their starting materials they are either very readily soluble or insoluble in water. The water-insoluble products according to the invention can be dissolved in suitable inert organic solvents. All of them possess a very slight volatility so that their handling during production, storage and application involves relatively little risk.

Of the hitherto customary simple alkyl-Hg compounds such as methyl-Hg-hydroxide, methyl-Hg-chloride and ethyl-Hg-chloride, the last-mentioned compound exhibits the lowest vapour pressure. It amounts to $8 \cdot 10^{-4}$ mm. Hg at room temperature. In contrast thereto, the vapour pressure at room temperature of the compounds according to the invention described in Examples 1 and 2 is so low that it can not be measured. Measurable values are obtainable only above 80° C. for the compound of Example 1, and above 110° C. for the compound of Example 2. Consequently, the vapour pressure of both compounds must lie substantially below $10^{-5}$ mm. Hg.

The following examples are given for the purpose of illustrating the invention.

*Example 1.—N - N' - bis(methylmercuric) - N - N'-bis-(methanesulphonyl)-hydrazine*

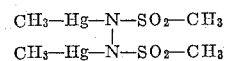

100 g. of bis-(methylmercuric) sulphate with an analytically found content of 74.82% of Hg and 20.34% of SO$_4$-ions are dissolved in 800 cc. of distilled water and treated with 430 cc. of halogen-free 1 N sodium hydroxide solution. Into this clear solution which reacts neutral to Congo paper and still slightly acid to litmus paper there is run at room temperature with stirring a solution of 41 g. of bis-(methanesulphonyl)-hydrazine in 400 cc. of distilled water. The separation of a white precipitate begins at once and is completed after stirring for about 3 hours. The precipitate is filtered off with suction, thoroughly washed several times with distilled water and dried for about 48 hours in a vacuum at an external temperature of about 40–50° C. Approximately 118 g. of a white product are thus obtained of which not more than traces dissolve in water and in the customary inert organic solvents, and which can be employed for the preparation of seed dressings without further purification. 60.7% of Hg are found therein by analysis, so that 95.75% of the initial mercury content are recovered in the product.

*Example 2.—N-N'-bis-(ethylmercuric)-N-N'-bis-(methanesulphonyl)-hydrazine*

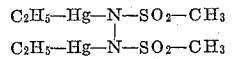

Into 800 g. of an aqueous solution of ethyl mercuric hydroxide showing a just noticeable alkaline reaction to phenolphthalein paper and containing, according to analysis, 7.25% of Hg and also, from its production, some sodium sulphate there is run at room temperature with good stirring a solution of 40 g. of N-N'-bis-(methanesulphonyl)-hydrazine in 400 cc. of distilled water, whereupon a thick white precipitate forms immediately. The mixture is stirred at room temperature for a further 2 hours to complete the reaction, and the precipitate formed is then filtered off with suction. In order to remove the bulk of still adhering extraneous salts, the precipitate is again thoroughly stirred at room temperature with 1000 cc. of distilled water and then again sharply filtered off with suction. The filter residue is dried at strongly reduced pressure and an external temperature of about 45–50° C. for about 48 hours, and 91 g. of a white powder are thus obtained which can likewise be used for the preparation of a seed dressing without further purification. Also of this compound not more than traces dissolve in water or in the conventional inert organic solvents. 60.5% of Hg and 9.94% of sulphur were found by analysis.

*Example 3.—N-N'-bis-(methylmercuric)-N-N'-bis-acetyl-hydrazine*

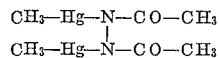

To 345 g. of a methanolic solution of methylmercuric hydroxide containing 14.21% of Hg according to analysis, there is added at room temperature with stirring a solution of 15 g. of N-N'-bis-acetyl-hydrazine in 200 cc. of methanol. Only after a few hours a slight separation of crystals sets in. The reaction mixture is concentrated on a water bath to about 250 cc., then cooled to about −5° C., and the crystal mass thus formed is sharply filtered off with suction. The crystals are redissolved from about 200 cc. of hot methanol. 53 g. or 79.5% of the theoretically possible quantity of N-N'-bis-methyl-mercuric-N-N'-bis-acetyl-hydrazine of M.P. 204° C. are thus obtained, the analysis of which shows 72.9% of mercury and 5.21% of nitrogen. By concentration and cooling of the methanolic mother liquors a further 8–10 g. of a somewhat less pure product can be isolated so that the total yield amounts to at least 93% of the theoretical. The compound is very readily soluble in water and methanol.

*Example 4.—N-N'-bis-(methylmercuric)-N-N'-bis-benzoyl-hydrazine*

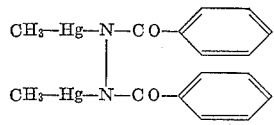

31 g. of N-N'-dibenzoyl-hydrazine are dissolved in 1200 cc. of distilled water containing 10.72 g. of sodium hydroxide. Into the solution of the disodium salt of dibenzoyl-hydrazine which is suction-filtered until clear and shows a strongly alkaline reaction to phenolphthalein, there is run at room temperature with stirring 709 g. of a solution of bis-(methylmercuric)-sulphate which is rendered neutral to litmus and then likewise filtered clear and which contains 7.06% of mercury and, from its production according to Example 4 of German patent specification No. 1,003,733, fairly large amounts of sodium sulphate. A strong white precipitate forms immediately and is sharply filtered off with suction after stirring for a further three hours. The filtrate obtained is practically neutral to litmus. The suction-filtered product is redissolved from boiling benzene and yields 81 g., i.e. 97% of the theoretically possible quantity, of N-N'-bis-methyl-mercuric-N-N'-bis-benzoyl-hydrazine in the form of white crystals which are practically insoluble in water and cold alcohol, and barely soluble in hot alcohol. Also in cold benzene the product dissolves only with great difficulty, but somewhat more readily in boiling benzene. The compound does not yet melt at 235° C. and shows by analysis 59.5% of mercury and 4.34% of nitrogen.

*Example 5.—N-N'-bis-methylmercuric-N-benzoyl-N'-benzenesulphonyl-hydrazine*

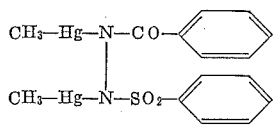

40 g. of N-benzoyl-N'-benzenesulphonyl-hydrazine are dissolved in 1000 cc. of water containing 13.35 g. of sodium hydroxide. Into the solution which is filtered clear and reacts strongly alkaline to phenolphthalein there are run with stirring at room temperature 770 g. of a solution of bis-methylmercuric sulphate obtained according to German patent specification No. 1,003,733 which has not been further purified, but rendered neutral as exactly as possible and then filtered clear, containing in addition to a large amount of sodium sulphate, 8.42% of mercury. A strong white precipitate forms immediately and, after further stirring for three hours, is sharply filtered off with suction. The filtrate reacts just alkaline to litmus. After redissolving from hot methanol, the suction-filtered precipitate melts sharply at 191° C. with simultaneous very strong decomposition, and contains 56.6% of mercury and 4.63% of sulphur. In this way, 97 g. of N-N'-bis-methylmercuric-N-benzoyl-N'-benzenesulphonyl-hydrazine are obtained corresponding to 85.3% of the theoretically possible quantity. By concentration of the methanolic mother liquor there can be obtained a further 10 g. of the product in practically the same state of purity so that the total yield exceeds 94% of the theoretical. The product is practically insoluble in water, barely soluble in cold methanol, substantially more readily soluble in hot methanol.

*Example 6.—N-N'-bis-methylmercuric-N-acetyl-N'-benzoylhydrazine*

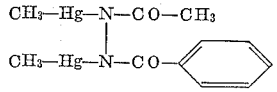

To a solution of 22 g. of N-acetyl-N'-benzoyl-hydrazine in 800 cc. of methanol there are added at room temperature with stirring 448 g. of a solution of methylmercuric hydroxide in methanol, which contains 11.17% of Hg. The reaction mixture which remains clear is brought to dryness under reduced pressure on a water-bath. After redissolving the residue from hot methanol, there are obtained 40 g., i.e. 53% of the theoretical yield, of a white crystalline product whose analytical values with 66.1% of Hg and 4.61% of N, agree very well with N-N'-bis-methylmercuric-N-acetyl-N'-benzoylhydrazine. From the redissolved mother liquor a further 23 g. of this compound can be obtained by concentrating and redissolving, in the same way so that a total yield of at least 83%, referred to the Hg employed, is obtained. The compound is barely soluble in water, but very readily soluble in hot methanol, substantially more difficultly soluble in cold methanol, and it melts at 159° C.

*Example 7*

The field and hot house experiments for testing the fungicidal activity were carried out with the said mercury compounds as dry seed dressings (dr). The dry dressing essentially consisted of fine-grained talc to which the active substances had been added in a fine-grained state in the indicated amount. In the case of wheat the test related to *Tilletia tritici*, in the case of barley to *Helminthosporium gramineum*, and in the case of oats to *Ustilago avenae*. In order to make the test more conclusive, not only naturally infected oat seeds (A), but also artificially infected oat seeds (B) were employed. The results are given in the following Tables I and II. In these tables the compounds employed are characterised by the numbers of the examples.

TABLE I.—RESULTS OF FIELD TESTS

| Active substance | Active substance concentration in seed dressings in percent Hg | Method of application and amount of seed dressing used in g./kg. | | Number of infected wheat ears, barley plants or oat panicles in a total of— | | | |
|---|---|---|---|---|---|---|---|
| | | Wheat and barley | Oats | Appr. 8,200 wheat ears | Appr. 4,700 barley plants | Appr. 1,900 oat panicles | |
| | | | | | | A | B |
| Undressed | | | | 2,352 | 237 | 26 | 786 |
| Control prep.: | | | | | | | |
| Phenyl-Hg-acetate | 1.75 | dr. 1.5 | dr. 2.25 | 47 | 28 | 14 | 592 |
| | | 2 | 3 | 21 | 13 | 8 | 511 |
| Ethyl-Hg-chloride | 1.75 | dr. 1.5 | dr. 2.25 | 0 | 0 | 4 | 19 |
| | | 2 | 3 | 0 | 0 | 2 | 17 |
| Methyl-Hg-hydroxide | 1.75 | dr. 1.5 | dr. 2.25 | 0 | 0 | 0 | 16 |
| | | 2 | 3 | 0 | 0 | 0 | 18 |
| Compounds according to the invention: | | | | | | | |
| 1 | 1.75 | dr. 1.5 | dr. 2.25 | 0 | 0 | 1 | 19 |
| | | 2 | 3 | 0 | 0 | 0 | 18 |
| 2 | 1.75 | dr. 1.5 | dr. 2.25 | | | 1 | 32 |
| | | 2 | 3 | | 0 | 1 | 19 |

TABLE II.—HOT HOUSE TESTS

| Active substance | Concentration of the active substance in seed dressing in percent Hg | Method of application and amount of seed dressing used in g./kg. of seed | | Number of infected barley plants or oat panicles in a total of— | |
|---|---|---|---|---|---|
| | | Barley | Oats | 100 barley plants | 100 oat panicles |
| Undressed | | | | 31.0 | 32.0 |
| 3 | 0.8 | dr. 2 | | 0.0 | |
| | 1.2 | dr. 2 | | 0.0 | |
| | 1.75 | dr. 2 | dr. 3 | 0.0 | 0.0 |
| 4 | 1.0 | dr. 2 | | 0.0 | |
| | 1.75 | dr. 2 | | 0.0 | |
| 5 | 1.75 | dr. 2 | | 0.0 | |
| 6 | 1.75 | dr. 2 | dr. 3 | 0.0 | 0.0 |

We claim:
1. An organomercuric hydrazine compound of the formula

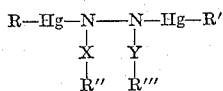

in which
R, R', R'' and R''' stand for a member selected from the group consisting of alkyl with 1 to 4 carbon atoms, cycloalkyl with 5 to 6 ring members, phenyl and the chloro, bromo, hydroxy, nitro, alkoxy, acyloxy and dialkylamino substitution products thereof, the alkoxy, acyloxy and alkyl groups of these substituents containing 1 to 4 carbon atoms, and
X and Y stand for a member selected from the group consisting of carbonyl and sulfonyl groups.

2. A compound of claim 1 wherein X stands for a carbonyl group and Y stands for a carbonyl group.

3. N - N' - bis(methylmercuric) - N - N' - (methanesulfonyl)-hydrazine.

4. N - N' - bis - (ethylmercuric) - N - N' - bis - (methanesulfonyl)-hydrazine.

5. N - N' - bis - (methylmercuric) - N - N' - bis-acetyl-hydrazine.

6. N - N' - bis - (methylmercuric) - N - N' - bis-benzoyl-hydrazine.

7. N - N' - bis - methylmercuric - N - benzoyl - N'-benzenesulfonyl-hydrazine.

8. N - N' - bis - methylmercuric - N - acetyl - N'-benzoylhydrazine.

9. An organomercuric hydrazine compound of the formula

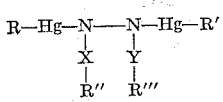

in which R, R', R'' and R''' stand for a member selected from the group consisting of alkyl with 1 to 4 carbon atoms, cycloalkyl with 5 to 6 ring members, phenyl and the chloro, bromo, hydroxy, nitro, alkoxy, acyloxy and dialkylamino substitution products thereof, the alkoxy, acyloxy and alkyl groups of these substituents containing 1 to 4 carbon atoms, and X and Y each represent a sulfonyl group.

10. An organomercuric hydrazine compound of the formula

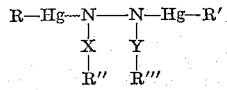

in which R, R', R'' and R''' stand for a member selected from the group consisting of alkyl with 1 to 4 carbon atoms, cycloalkyl with 5 to 6 ring members, phenyl and the chloro, bromo, hydroxy, nitro, alkoxy, acyloxy and dialkylamino substitution products thereof, the alkoxy, acyloxy and alkyl groups of these substituents containing 1 to 4 carbon atoms, X represents a carbonyl group and Y represents a sulfonyl group.

11. Process for the production of organomercuric hydrazine compounds according to claim 1 which comprises reacting a member selected from the group consisting of bis-acyl-hydrazines and the alkali metal salts thereof with an organomercuric salt wherein one valence of the Hg-atom is linked directly to a carbon atom of an organic radical and the other valence is occupied by a member selected from the group consisting of an acid residue and the hydroxyl group.

References Cited by the Examiner

UNITED STATES PATENTS

| | | | |
|---|---|---|---|
| 1,485,021 | 2/1924 | Engelmann | 167—22 |
| 2,900,298 | 8/1959 | Jaworski et al. | 167—22 |

OTHER REFERENCES

Brodersen et al., Berichte der Deutschen Chemischen Gesellschaft, vol. 91, No. 12 (1958), p. 2702.

Whitmore, Organic Compounds of Mercury, ACS Monograph Series (1921), p. 140.

TOBIAS E. LEVOW, *Primary Examiner.*

E. C. BARTLETT, H. M. S. SNEED,
*Assistant Examiners.*